April 29, 1947.  M. F. SKINKER ET AL  2,419,602
RECTIFIER AND METHOD OF MAKING THE SAME
Filed Aug. 14, 1943  2 Sheets-Sheet 1

INVENTORS
MURRAY F. SKINKER
LESLIE B. HAIGH
BY
ATTORNEY

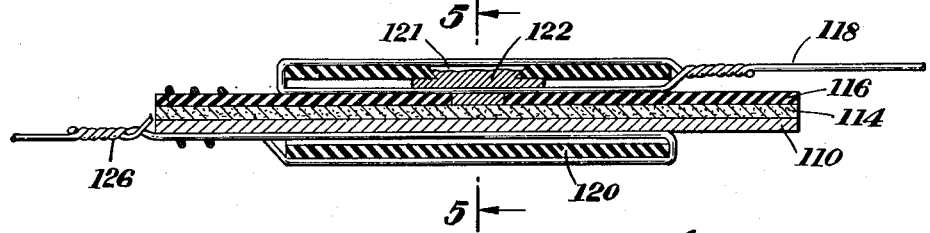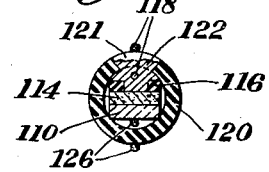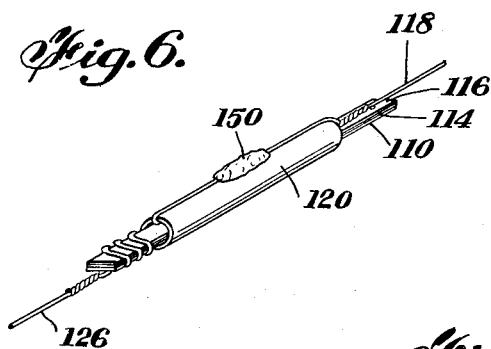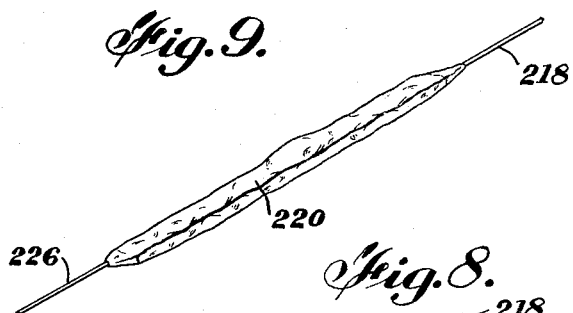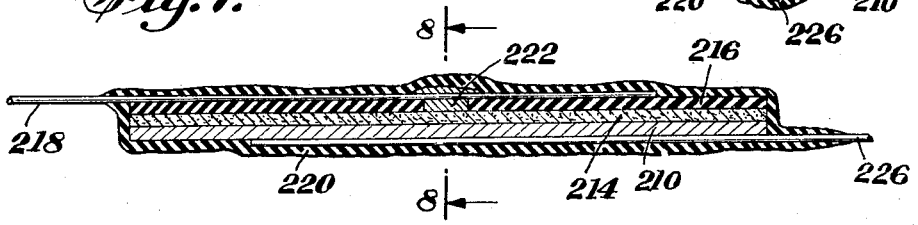

Patented Apr. 29, 1947

2,419,602

UNITED STATES PATENT OFFICE 2,419,602

RECTIFIER AND METHOD OF MAKING THE SAME

Murray F. Skinker, Montclair, and Leslie B. Haigh, West Orange, N. J., assignors to Federal Telephone and Radio Corporation, Newark, N. J., a corporation of Delaware Application August 14, 1943, Serial No. 498,654

9 Claims. (Cl. 175—366)

This invention relates to improvements in rectifiers and methods of making the same, and more particularly to rectifiers of the dry contact type, such as selenium rectifiers.

An object of this invention is directed to the provision of improved, small, low-capacity rectifiers.

Another object of this invention is to provide a small rectifier of simple design and high efficiency.

A further object of this invention is directed toward an improved and simplified method of making rectifiers.

Generally speaking, this invention may be defined as comprising the constructions and combinations recited in the annexed claims and illustrated in certain embodiments in the drawings accompanying and forming a part of this application, wherein:

Fig. 4 is a longitudinal cross-sectional view of a modified rectifier construction;

Fig. 5 is a transverse cross-sectional view taken along line 5—5 of Fig. 4;

Fig. 6 is a perspective view of the finished rectifier illustrated in Fig. 4;

Fig. 7 is a longitudinal cross-sectional view of still another form of rectifier;

Fig. 8 is a transverse cross-sectional view taken along the line 8—8 of Fig. 7; and Fig. 9 is a perspective view of the completed rectifier illustrated in Fig. 7.

Figure 1:
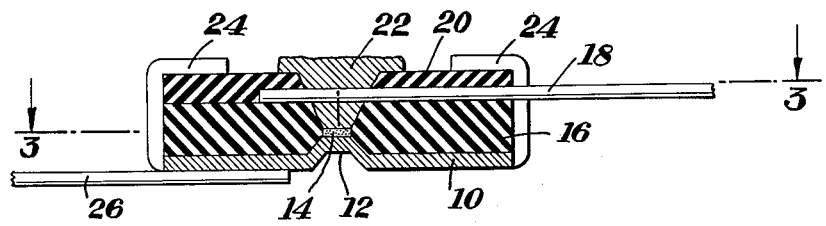
Fig. 1 is a longitudinal cross-sectional view of a preferred form of rectifier construction in accordance with the present invention.
Figure 2:
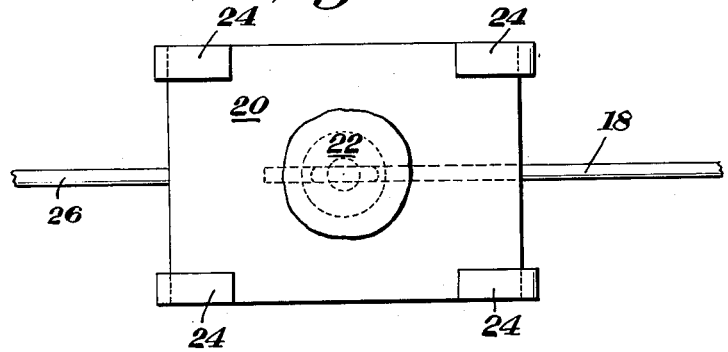
Fig. 2 is a top plan view of the rectifier illustrated in Fig. 1.
Figure 3:
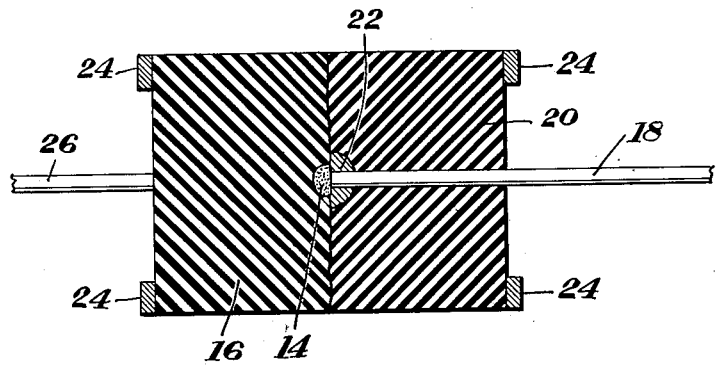
Fig. 3 is a horizontal cross-sectional view taken along the line 3—3 of Fig. 1.

In the first form of invention shown in Figs. 1, 2 and 3, it will be seen that the rectifier is built-up on a metal base plate 10 having a raised portion 12, preferably substantially centrally located with respect to the plate as a whole, upon which is formed in any suitable manner known to the art, a thin selenium layer 14. A layer of insulation 16, which may be a thermoplastic artificial insulation such as polystyrene or may be formed of insulating paper is placed on the base 10 and is provided with a through opening uncovering the selenium spot 14. A lead wire 18 is placed on the insulating layer 16, passing over the opening therethrough and a second layer of insulation 20 is applied over the lead wire 18 and joining with the first insulating layer 16. The second insulating layer is also provided with a through opening substantially aligned with the opening in the insulating layer 16. Counter-electrode alloy is then melted and poured through the aligned openings forming contact with the selenium layer 14 and, at the same time fusing with a portion of the lead wire 18 and thus holding the latter in position. In accordance with the construction of the described modification, the base plate 10 is preferably formed with four ears 24 at its corners and these are bent upwardly and over the top insulating layer 20 pressing the parts against the base plate 10 to form a unitary structure. A second lead wire 26 may be soldered or otherwise attached to the base plate 10.

It will be seen from the description just given that the described construction provides a very simple and yet extremely efficient low capacity rectifier. The selenium spot and the counter-electrode area in contact therewith are kept small, thus providing for high current density and improved efficiency of the rectifier. In the drawings, the thickness of the parts such as the metal plate 10, selenium layer 14 and the insulating layers 16 and 20' have been exaggerated for the purposes of clear illustration, and while the invention is not intended to be limited to any particular size, it may be mentioned that rectifiers of the type described have been manufactured with a length of about 3/8 of an inch, a width of about 1/4 of an inch and a thickness of less than 1/8 of an inch. Additionally, while the integral legs formed on the base plate are shown to extend longitudinally thereof, it will be obvious to those skilled in this art that these built-up and turned-over legs could project laterally from the base plate as well. After assembly of the exposed portions of the rectifier, including the base plate, the turned-over legs, the counter-electrode alloy and parts of the lead wires can be further insulated as by painting, if desired.

In the second form of this invention, illustrated in Figs. 4, 5 and 6, a base plate 110 has placed thereon a selenium layer 114 which, in turn, is covered by a layer of insulation 116 having a small central opening leading to the selenium layer beneath. The base plate selenium layer and insulating layer may then be surrounded by an insulating tube 120, for example, a small piece of "spaghetti" which also may be provided with an opening 121 substantially aligned with the opening in the insulating layer 116. Lead wire 118 is longitudinally looped around one side of the insulating tube 120 so that a portion thereof between the insulating layer 116 and tube 120 passes over the hole above the selenium layer. Counter-electrode alloy 122 is then melted through the opening 121 around a part of the lead wire 118 and through the opening in the insulating layer 116 to make contact with the selenium layer 114. The lead wire 118 is thus firmly connected with the counter-electrode alloy, the loop about the tube 120 merely assisting to take the strain off the connection with the counter-electrode alloy and hold the insulating tube 120 in place. A second lead wire 126 may be attached to the metal plate 110 and this tube, and may be longitudinally looped about the tubing to form a stronger and more permanent lead connection. After the counter-electrode alloy has been melted through the opening 121, the latter may be closed by melting on or otherwise applying a small mass or strip of insulation 150. In Figs. 4 and 5 the relative thicknesses of the insulating layers, the selenium layer and the metal plate have been exaggerated for the sake of clarity. Actually, the resulting rectifier structure may have somewhat the proportions as shown in Fig. 6 which is approximately four times the size of rectifiers of this type which have been constructed.

Figs. 7, 8 and 9 illustrate the most simplified form of rectifier in accordance with the present invention. Again, a layer of selenium 214 is applied to one side of a metal base plate 210 and a layer of insulating material 216 which may be, for example, masking tape, is placed over the selenium plate. The insulating layer 216 has a central opening therethrough, and a lead wire 218 is placed upon this insulating layer with a portion thereof extending over the opening. Counter-electrode alloy 222 is melded through the opening in the insulating layer against the selenium layer 214 on the one hand and fusing with a portion of the lead wire 218 on the other hand. A second lead wire 226 is soldered or otherwise attached to the lower side of the metal base plate 210. The parts are then sprayed, dipped or otherwise painted in an insulating paint to form a small integral rectifier unit. This insulation not only performs its external insulating function but also assists in attaching the lead wires to the unit and holding them in place.

Again for the purposes of illustration, the thicknesses of the plate and the selenium and insulating layers have been exaggerated in Figs. 7 and 8, while the entire rectifier unit as it will actually appear but drawn to about four times actual size is illustrated in Fig. 9.

Various changes and modifications coming within the scope of the present invention will occur to those skilled in this art. The base plate 10 will preferably consist of a metal containing iron but other metals suitable for use with selenium for the purposes of rectification may be used, or the base plate 10 may be formed of any metal coated with an iron-containing alloy. The manner in which the selenium is applied to the base plate is of no particular importance with respect to the present invention and various methods known to the art may be utilized, while after assembly, the rectifier may be electroformed in the usual manner to create the desired barrier layer. As previously pointed out, the insulating layers can be any suitable insulation, either artificial resinous insulating materials or plain or impregnated paper. In the form of invention illustrated in Figs. 1, 2 and 3, the selenium may be applied over the entire base plate, as in the other forms illustrated, instead of on a raised spot.

Accordingly, while we have described above the principles of our invention in connection with specific apparatus and particular modifications thereof, it is to be clearly understood that this description is made only by way of example and not as a limitation on the scope of our invention as set forth in the objects and the accompanying claims.

For claims specifically directed to the form of the invention shown in Figs. 1 to 3, reference is to be made to co-pending application No. 720,035, filed January 3, 1947, in the name of Leslie B. Haigh, one of the joint applicants named herein.

We claim:

1. A rectifier comprising, in combination, a metallic base plate, a layer of selenium on said base plate, a layer of insulating material on said selenium layer, and having a small opening therethrough exposing a portion of the selenium layer, counter-electrode alloy extending through said opening to contact said selenium, a lead wire fused to said counter-electrode alloy, and a second continuous insulating layer extending about said base plate, selenium layer, first insulating layer and lead wire.

2. The combination according to claim 1, in combination with a second lead wire attached to said base plate and surrounded by said second insulating layer.

3. A rectifier comprising, in combination, a metallic base plate, a layer of selenium on said base plate, a layer of insulation on said selenium, having an opening therethrough exposing a portion of the selenium, an insulating tube surounding said base plate, selenium and insulating layer, and having an opening therethrough substantially aligned with the opening in said insulating layer, counter-electrode alloy extending through said two openings to the selenium layer, and a lead wire extending between said insulating layer and said insulating tube and fused in said alloy.

4. The combination according to claim 3, in combination with further insulating material covering the opening in said insulating tube.

5. The combination according to claim 3, in combination with a second lead wire attached to said base plate and extending between said base plate and said insulating tube.

6. The combination according to claim 3, in which said lead wire is in the form of a closed loop extending longitudinally inside and outside of said insulating tube, and in which the inner portion of the loop is fused to said counter-electrode alloy.

7. The combination according to claim 3, in which said lead wire is in the form of a closed loop extending longitudinally inside and outside of said insulating tube, and in which the inner portion of the loop is fused to said counter-electrode alloy, in combination with a second lead wire in the form of a closed loop extending longitudinally inside and outside of said insulating tube, substantially diametrically opposite to said first loop and attached to said base plate.

8. A rectifier comprising, in combination, a metallic base plate, a layer of selenium on said base plate, a layer of insulation on said selenium, having an opening therethrough exposing a portion of the selenium layer, counter-electrode alloy extending through said opening to said selenium, a first lead wire attached to said counter-electrode alloy, a second lead wire attached to said base plate, and a continuous insulating layer enclosing said base plate, selenium layer, the layer of insulation, the counter-electrode alloy, and the attached portions of said lead wires.

9. The method of making a rectifier which includes the steps of forming a selenium layer on a metal base plate, covering the selenium layer with an insulating layer having an opening therethrough, melting counter-electrode alloy through said opening against said selenium layer, attaching a lead wire to the counter-electrode alloy, attaching a second lead wire to the base plate, and painting the exposed portions of the base plate, selenium layer, insulating layer, the counter-electrode alloy and the connected portions of the lead wire with a continuous insulating coating.

MURRAY F. SKINKER.
LESLIE B. HAIGH.

REFERENCES CITED

The following references are of record in the file of this patent:

UNITED STATES PATENTS

| Number | Name | Date |
| --- | --- | --- |
| 2,182,377 | Guanella | Dec. 5, 1939 |
| 2,217,471 | Conrad | Oct. 8, 1940 |
| 2,261,618 | Esseling et al. | Nov. 4, 1941 |
| 2,131,167 | De Boer | Sept. 27, 1938 |
| 2,303,801 | Van Geel et al. | Dec. 1, 1942 |
| 2,314,104 | Richards | Mar. 16, 1943 |

FOREIGN PATENTS

| Number | Country | Date |
| --- | --- | --- |
| 454,548 | British | Oct. 2, 1936 |